US007073800B2

(12) United States Patent
Shaw et al.

(10) Patent No.: US 7,073,800 B2
(45) Date of Patent: Jul. 11, 2006

(54) CHILD CARRIER ATTACHMENT FOR SHOPPING CARTS

(76) Inventors: Mark D. Shaw, 132 Sea Lily La., Ponte Vedra Beach, FL (US) 32082; J. Tad Heyman, 659 Ocean Blvd., Atlantic Beach, FL (US) 32233; Laurence M. Bierce, 1215 Pine Cir., Macclenny, FL (US) 32063

(*) Notice: Subject to any disclaimer, the term of this patent is extended or adjusted under 35 U.S.C. 154(b) by 118 days.

(21) Appl. No.: 10/752,806

(22) Filed: Jan. 7, 2004

(65) Prior Publication Data

US 2005/0146101 A1    Jul. 7, 2005

(51) Int. Cl.
*B62D 39/00*    (2006.01)

(52) U.S. Cl. .......................... 280/33.991; 280/33.992; 280/33.993; 280/DIG. 4; 280/47.34; 280/47.38; 280/1.13; 280/1.16; 280/1.186; 280/1.201; 280/35

(58) Field of Classification Search ........... 280/33.991, 280/33.992, 33.993, DIG. 4, 47.34, 47.38, 280/1.13, 1.16, 1.201, 35, 1.186
See application file for complete search history.

(56) References Cited

U.S. PATENT DOCUMENTS

| | | | |
|---|---|---|---|
| 2,443,236 A | 6/1948 | Gallagher | |
| 3,497,234 A | 2/1970 | Schray | |
| 4,376,502 A * | 3/1983 | Cohen | ........................ 224/411 |
| 4,805,935 A | 2/1989 | Grayson | |
| 5,330,210 A | 7/1994 | Lambrecht | |
| 5,961,133 A | 10/1999 | Perry | |
| 6,237,924 B1 | 5/2001 | Reiland et al. | |
| 6,513,817 B1 * | 2/2003 | McCue et al. | ............. 280/79.2 |
| 6,523,840 B1 | 2/2003 | Koppes et al. | |
| D473,691 S * | 4/2003 | Kolada et al. | ............... D34/21 |
| 6,572,122 B1 * | 6/2003 | Johnson et al. | ......... 280/33.993 |
| 6,641,147 B1 * | 11/2003 | Werner | .................. 280/33.991 |
| 6,644,674 B1 * | 11/2003 | Simard | ................... 280/33.991 |
| D484,666 S * | 12/2003 | Caya | ........................... D34/27 |
| 6,676,139 B1 * | 1/2004 | Saccani | ................. 280/33.991 |
| 6,705,623 B1 * | 3/2004 | Nadeau et al. | ......... 280/33.991 |
| 6,746,030 B1 * | 6/2004 | Bartlett | .................... 280/47.38 |
| 6,749,204 B1 * | 6/2004 | Werner | .................. 280/33.992 |
| 6,761,365 B1 * | 7/2004 | Teeten | ................... 280/33.992 |
| 6,766,931 B1 * | 7/2004 | Wolf | .......................... 224/411 |

FOREIGN PATENT DOCUMENTS

DE      42 03 330 A1    2/1992
DE      43 37 917 A1    11/1993

* cited by examiner

*Primary Examiner*—Christopher P. Ellis
*Assistant Examiner*—Cynthia F. Collado
(74) *Attorney, Agent, or Firm*—Thomas C. Saitta

(57) ABSTRACT

A shopping cart carrier attachment for carrying at least one child, the child carrier having a main body with an entrance and a support platform or seat to support the child, the main body being removably attachable to the basket of the cart and to the lower frame of the cart such that the main body extends forward from and is suspended from the front of the cart. Most preferably, the child carrier is configured as a real world object, such as a vehicle.

34 Claims, 7 Drawing Sheets

CHILD CARRIER ATTACHMENT FOR SHOPPING CARTS

BACKGROUND OF THE INVENTION

This invention relates generally to child carrier seats or structures incorporated into or attached to shopping carts, such as those carts typically found in grocery stores, to provide seating for children in addition to or in place of the standard collapsible hinged seat disposed at the rear of the basket adjacent the basket handle. More particularly, the invention relates to such child carriers that are situated to the front of the shopping cart and that do not reduce the carrying capacity of the shopping cart. Even more particularly, the invention relates to such child carriers that are removable attachments to standard shopping carts.

Wheeled shopping carts suitable for carrying a large number of items are well known and are staple equipment in grocery stores, department stores, warehouse stores and the like. A typical shopping cart comprises a large, generally trapezoidal basket formed of wire mesh, the basket mounted at its rear onto support members such that the basket is disposed above a horizontally disposed lower frame and undercarriage tray. Four wheels are mounted below the lower frame, with the front wheels usually being castor or swivel wheels for easier turning of the cart. The basket handle is mounted to the rear of the basket and a hinged, collapsible seat is typical provided within the rear portion of the basket, the seat allowing a child to be seated with his or her legs dangling to the rear below the handle.

The standard collapsible seats are suitable for toddlers and very young children, but cannot accommodate larger children or multiple children. In addition, many children feel trapped in the seat or do not find it to be comfortable. To address this problem, shopping carts have been developed that incorporate larger seats, seats that face to the front of the cart, and seats having an aesthetic or imaginative design that allows the children to entertain themselves. Examples of such shopping carts are shown in U.S. Pat. No. 2,443,236 to Gallagher, U.S. Pat. No. 3,497,234 to Schray, U.S. Pat. No. 4,805,935 to Grayson, U.S. Pat. No. 5,330,210 to Lambrecht, U.S. Pat. No. 6,237,924 to Reiland et al., and U.S. Pat. No. 6,513,817 to McCue et al.

One class of shopping carts simply re-structures the cart such that the seat is positioned to the front of the cart rather than the rear. The Schray device is an example of this type, where the hinged collapsible seat is put in front of a vertically oriented basket. Gallagher shows a fixed seat positioned in the front of a cart having two baskets. The Reiland et al. patent shows a shopping cart where the basket is divided into forward and rearward sections by a bench seat.

The McCue et al. patent shows a shopping cart where the lower frame is extended forward a sufficient length to accommodate a child carrier mounted atop the extended portion of the frame. A third set of wheels is provided due to the extended length. The child carrier is an integral part of the cart and is adapted to look like a truck or other vehicle, such that the child or children may pretend to be driving the vehicle while the cart is being pushed. A significant problem with this device and the devices referred to above is that each shopping cart must be specially manufactured, since each design involves significant changes to the basic structure of standard shopping carts. Thus, storeowners must purchase these special carts separately from their standard shopping carts, resulting in higher costs for each cart since they are not buying in bulk. Furthermore, should any of the special carts become damaged, the cart must be individually repaired or replaced, meaning that fewer special carts are available to shoppers.

A preferred solution to the problem of specialized cart structures is to provide an improved child carrier system that is an attachment to standard shopping carts. With this construction, the storeowners can utilize the child carriers on the carts they already own. Overall costs are lowered, since each child carrier structure is purchased separately rather than purchasing a specialized cart. If a cart needs repair, the child carrier structure can be removed from the damaged cart and attached to an operative cart. For example, Grayson shows a simple approach, where a horizontal platform is placed onto the undercarriage tray and lower frame, and the child sits on the platform while holding handles. As can be expected, this is not likely to be comfortable over long periods of time, and any drips or spills from items placed in the basket will fall onto the child. This structure is also dangerous, in that the child can easily get his or her hands caught in the wheels. Another child carrier structure attachable to standard carts is illustrated in Lambrecht. While this device is adapted to give the appearance of a vehicle for the child to drive, again the child is positioned directly beneath the basket in a rather cramped posture.

It is an object of this invention to provide a child carrier for shopping carts that successfully addresses the problems set forth above, and in particular is a child carrier that is attachable and removable from standard shopping carts. It is an object to provide a child carrier attachment for a shopping cart that presents an imaginative and decorative appearance to provide entertainment value to the child, as well as to provide a pleasant configuration for other shoppers. It is an object to provide a child carrier that may accommodate more than one child in a comfortable manner.

SUMMARY OF THE INVENTION

The invention is in general an attachment for a shopping cart, the shopping cart being of standard configuration having a relatively large basket mounted above a lower wheeled frame, where the attachment is a child carrier that allows one or more children to be transported by movement of the cart. The child carrier attachment is readily attachable to and removable from the shopping cart, and comprises a main body most preferably configured to resemble or suggest a real object, such as a truck, a car, a rocket, a train, an animal, etc. The main body is provided with a support platform or floor to support the child in a standing position and may also include a seat to allow the child to sit. The main body is mounted to the basket and the frame, such that it is generally suspended from the front of the shopping cart, the term "suspended" being broadly defined herein to include the general concept of the main body being connected to the cart to the side of the main body, regardless of whether or not the main body or a wheel attached to the main body actually touches the ground. Most preferably the main body is mounted onto the forward frame crossbar of the cart and the front panel of the basket itself. In this preferred embodiment, a lateral channel to receive the frame crossbar is provided below a rearward extending mounting flange preferably incorporated as an extension of the main body structure. The upper portion of the main body is attached to the basket by any of multiple alternative suitable attachment means, such as by mechanical fasteners, straps, hooks, or the like. One or more swivel wheels or castors may be provided beneath the main body for added stability.

DETAILED DESCRIPTION OF THE INVENTION

Figure 1:
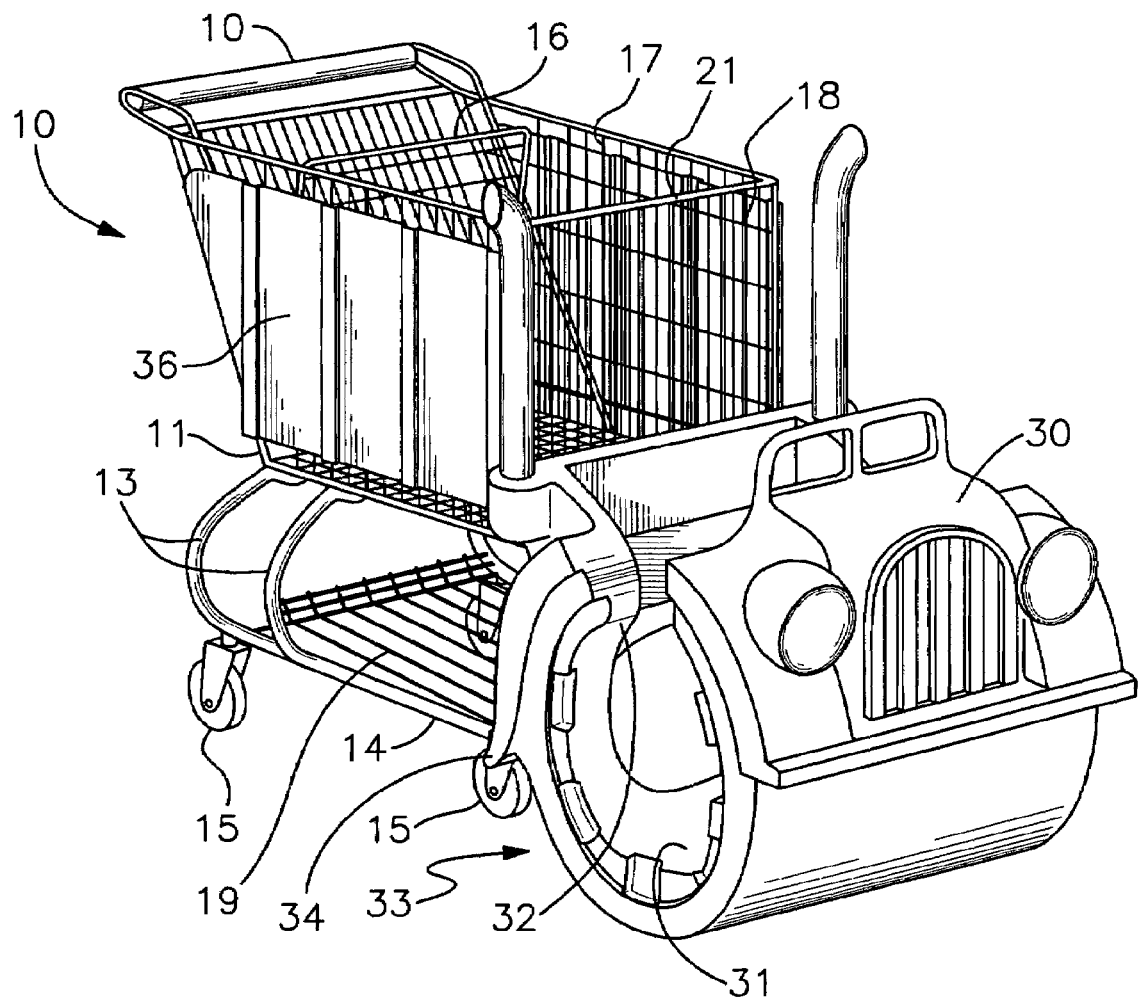
FIG. 1 is a perspective view of the child carrier assembly mounted onto a standard shopping cart, showing a carrier having a seat.

With reference to the drawings, the invention will now be described with regard for the best mode and the preferred embodiment. In general, the invention is a child carrier attachment for a wheeled shopping cart, the child carrier providing a means to transport a child or children in a seated or standing position through routine operation of the cart. The child carrier attachment is readily attached to and removed from a standard shopping cart, and does not reduce or interfere with the storage capacity of the cart to which it is attached. Most preferably, the child carrier is composed of a plastic material such that it can be manufactured with sufficient strength and rigidity at a relatively low weight. Also most preferably, the child carrier is configured to resemble or suggest objects in the real world, such as for example trucks, cars, rockets, trains, animals, etc.

The child carrier is mounted onto a standard shopping cart 10 that comprises a generally rectangular or trapezoidal basket 11 composed of a wire mesh or grid 17 on all four sides and bottom. A laterally extending, horizontally disposed handle 12 is mounted to the rear of the basket 11. A hinged, collapsible seat 16 may or may not be provided within the rear portion of the basket 11, such that a small child can be seated in the seat 16 with his or her legs extending to the rear. The basket 11 is mounted onto upwardly disposed basket support members 13, which are attached to the basket 11 at or adjacent its rear. The basket support members 13 are connected to or are formed as extensions of a generally horizontally disposed lower frame member 14, typically formed of a metal tube and having a laterally extending frame crossbar or nose member 20 defining its forward portion. Four wheels 15 are mounted beneath the lower frame 14, with the rear wheels 15 typically being of fixed orientation while the front wheels 15 are typically connected to the lower frame 14 in a manner that allows them to swivel in all directions. An undercarriage tray 19 spans the lower frame 14 to provide a second area for the retention of goods, with the undercarriage tray 19 typically consisting of longitudinally extending rods. Such constructions for shopping carts are well known and common. The child carrier of the invention will be attachable to various designs of such shopping carts 10, provided that the carts 10 have a lower frame 14 and a basket 11 supported above the lower frame 14 to which the child carrier can be attached.

Figure 2:
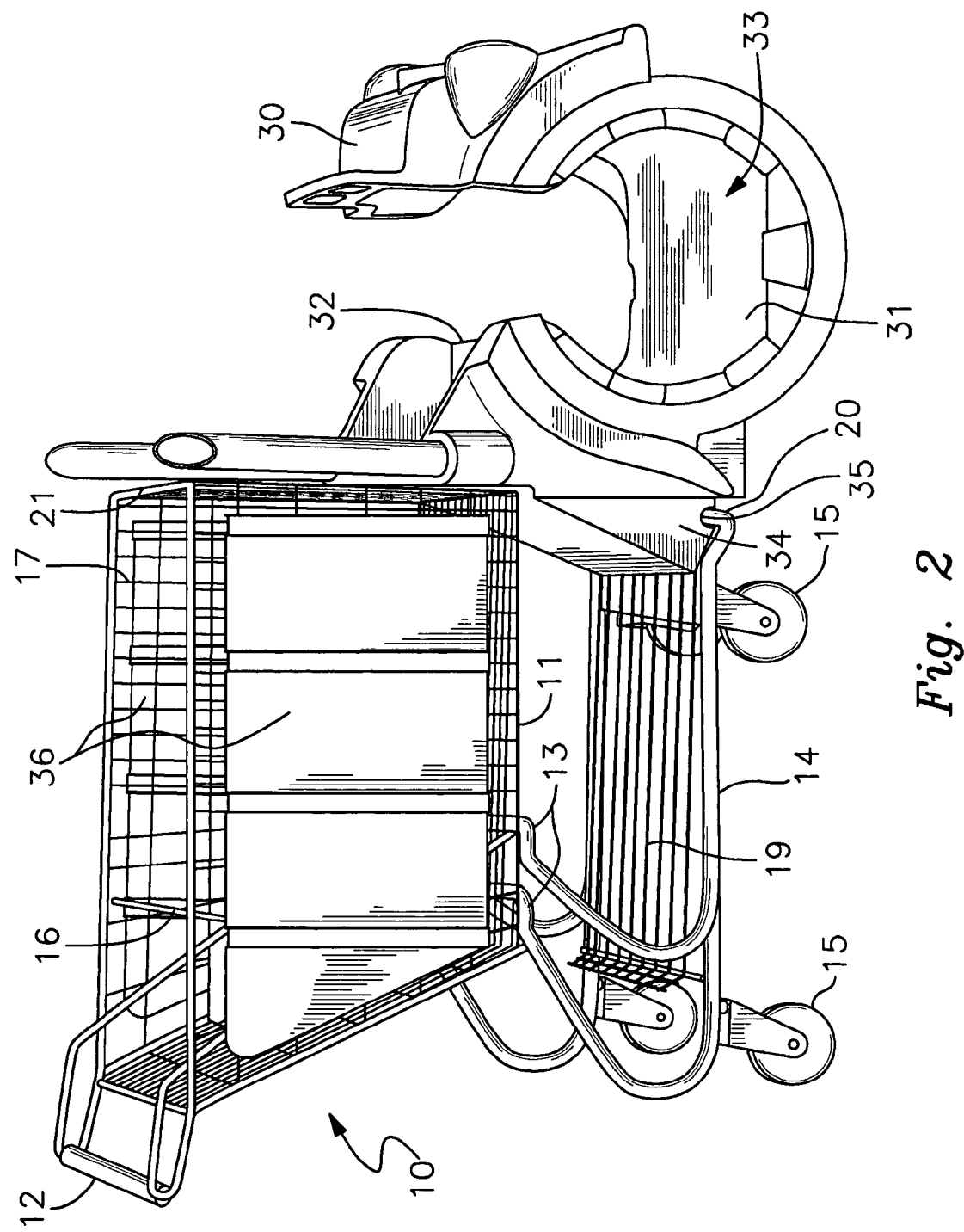
FIG. 2 is a side view of the child carrier assembly mounted onto a standard shopping cart.
Figure 3:
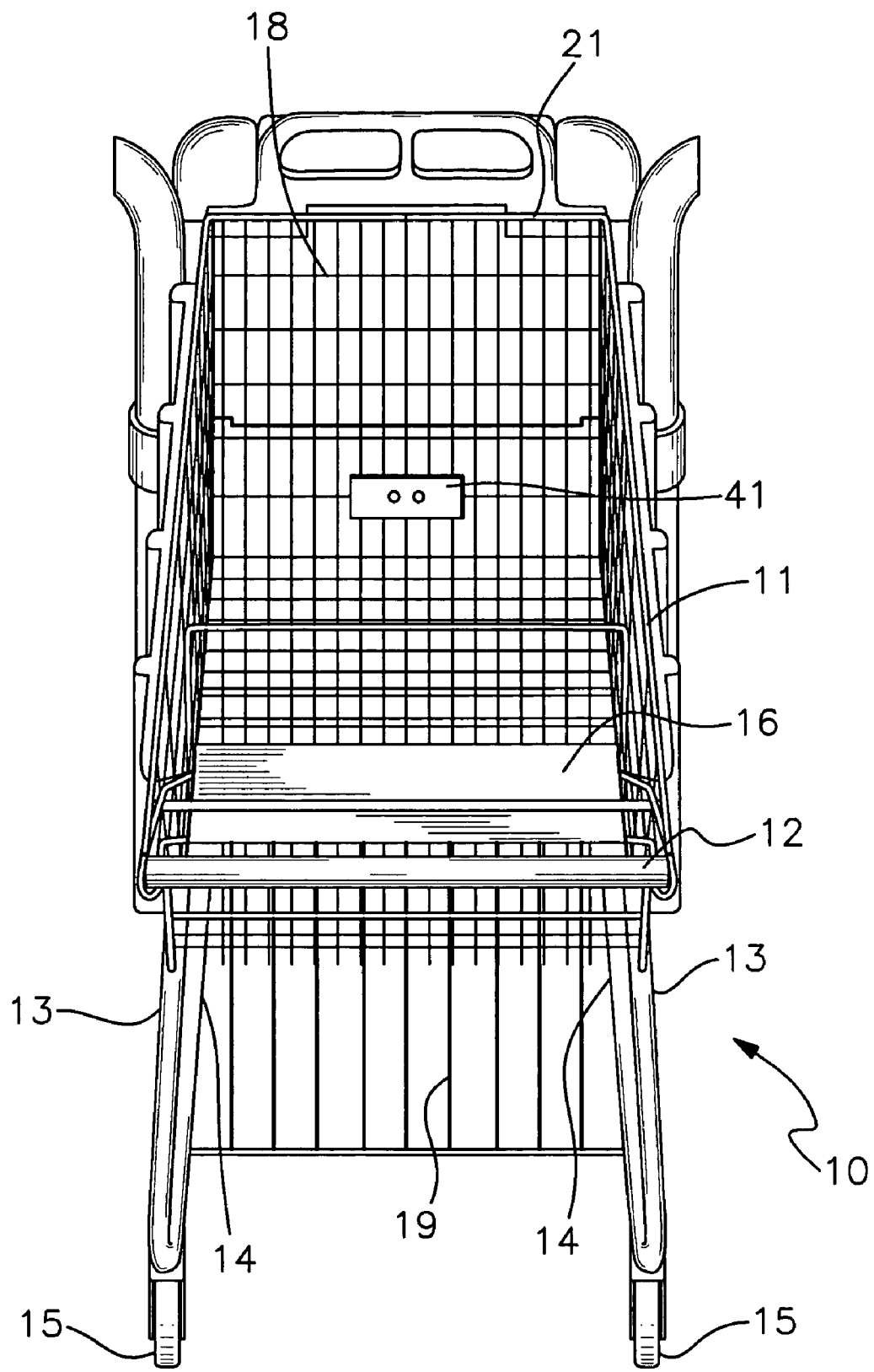
FIG. 3 is a rear view of the child carrier assembly mounted onto a standard shopping cart.

FIGS. 1 through 3 illustrate an embodiment of the invention wherein the child carrier is configured to represent a dump truck. The child carrier is comprised of a main body 30 that is shaped in this embodiment to give the appearance of a vehicle having wheels, headlights, windshield, front grill, vertical exhaust pipes, fenders and the like, such that the child can envision being the driver of the truck, the main body 30 being sized and configured to receive and support one or more children during movement of the shopping cart 10. The main body 30 is molded so as to be relatively lightweight yet with enough rigidity and strength to support multiple children. The body 30 is provided with a horizontally extensive, generally planar, support platform or floor 31 such that a child can be supported in a standing position. In the embodiment shown, the main body 30 also comprises a bench or seat 32 such that the child or children can be seated during movement of the cart 10. One or more entrances 33, preferably located on the side or sides of the main body 30, are provided to allow access into and from the support platform 31 and seat 32. Hinged doors or guards, not shown, may also be provided for safety purposes, but the entrances 33 are also preferably designed to be relatively narrow in order to decrease the likelihood that a child will accidentally fall from the main body 30. Additionally, the main body 30 may be provided with an upper bridging member extending over the entrance 33, not shown, as a safety feature, such that the child must duck to enter or exit the main body 30. To further bolster the visual illusion presented by the main body 30, decorative side panel members 36 may be attached to each side of basket 11.

Figure 4:
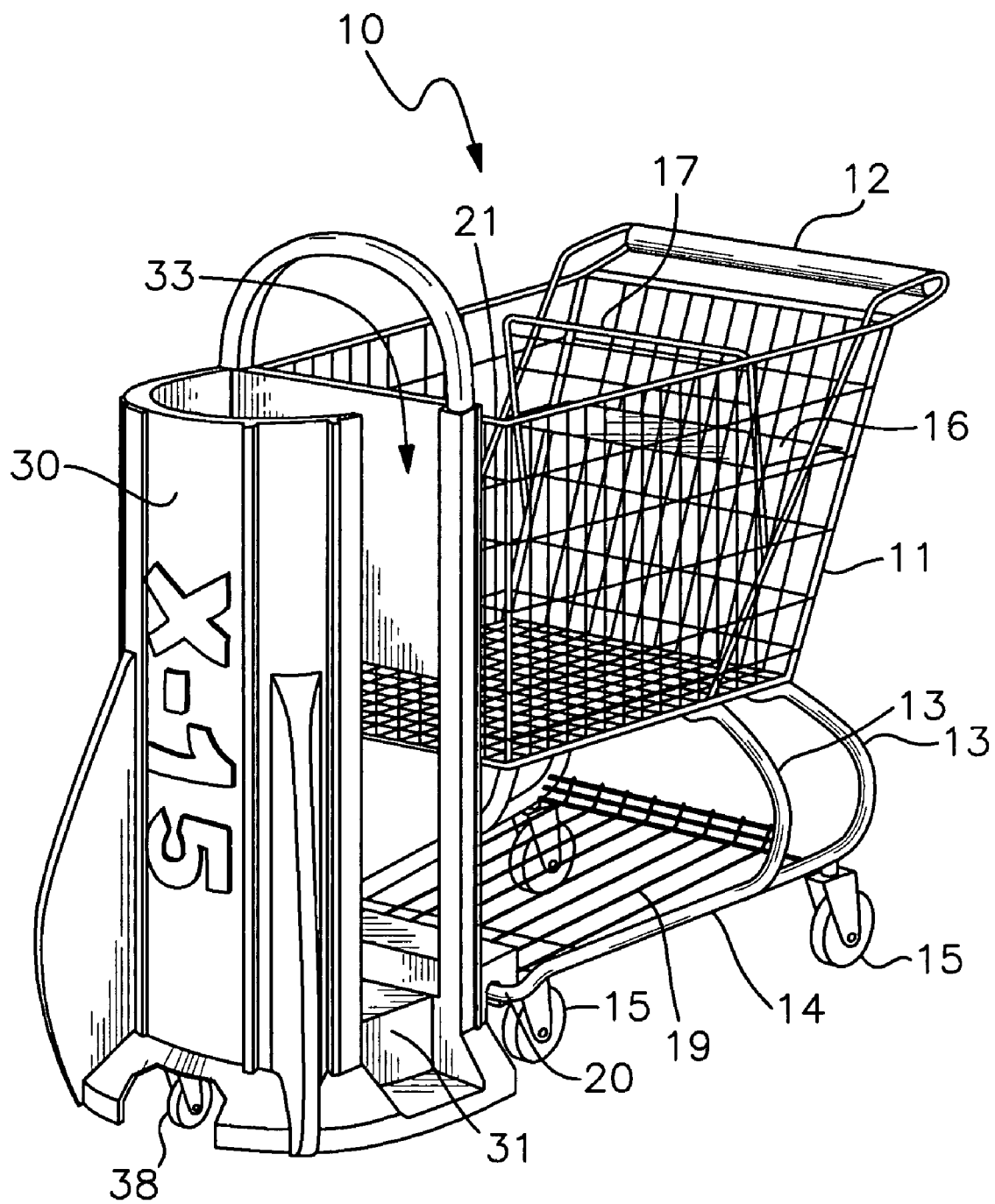
FIG. 4 is a perspective view of an alternative embodiment of the child carrier assembly mounted onto a shopping cart.
Figure 5:
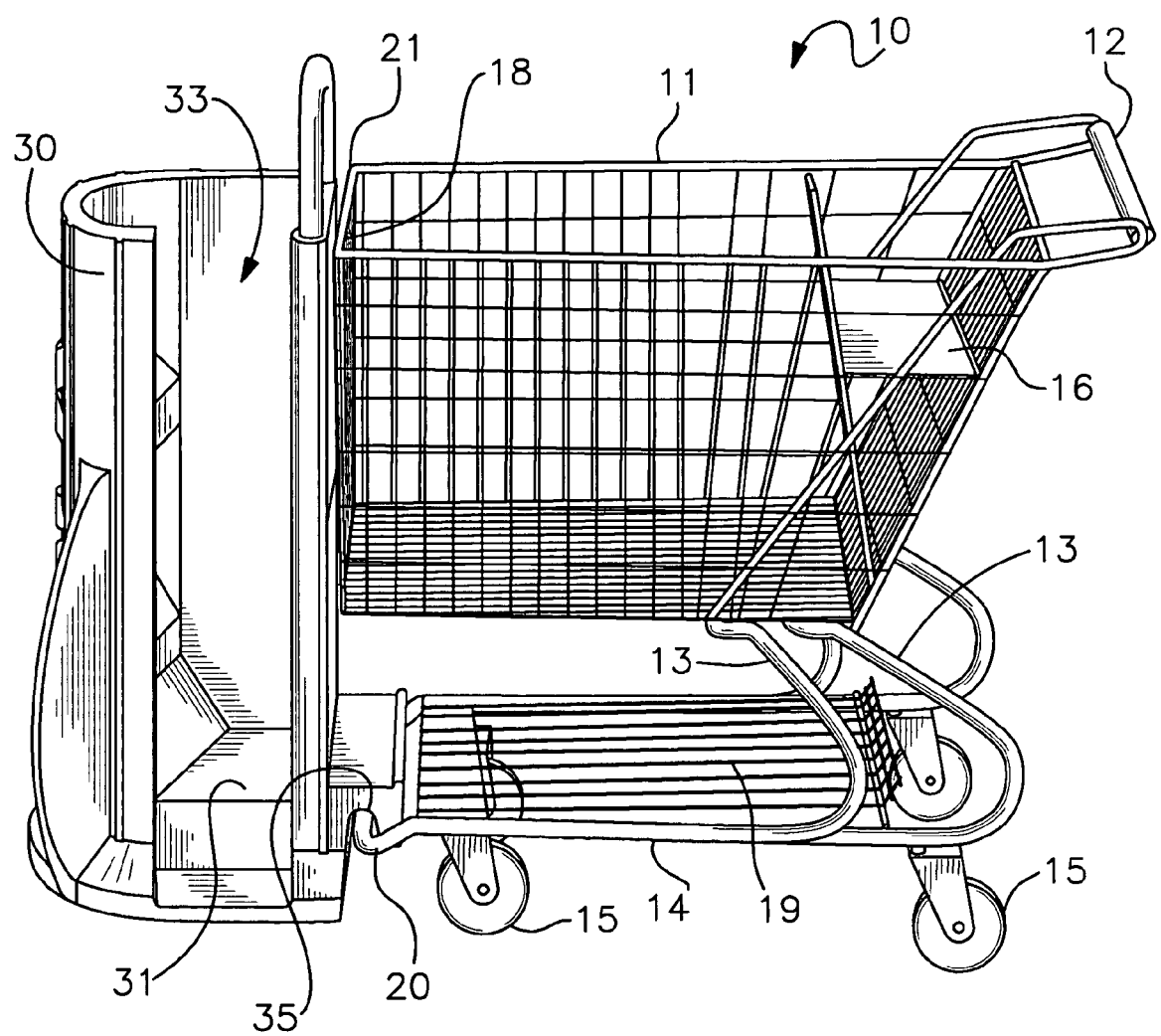
FIG. 5 is a side view of he alternative embodiment of FIG. 4.

In FIGS. 4 and 5, an alternative embodiment for the main body 30 is shown in which no seat 32 is provided, such that the child or children remains standing as the cart 10 is pushed. In this embodiment, the main body 30 is configured as a rocket. In FIG. 4, a forward portion of the main body 30 is cut-away to expose a carrier wheel 38 affixed beneath the main body 30; One of more carrier wheels or casters 38 may be provided beneath the support platform 31 of the main body 30 to increase stability.

Figure 6:
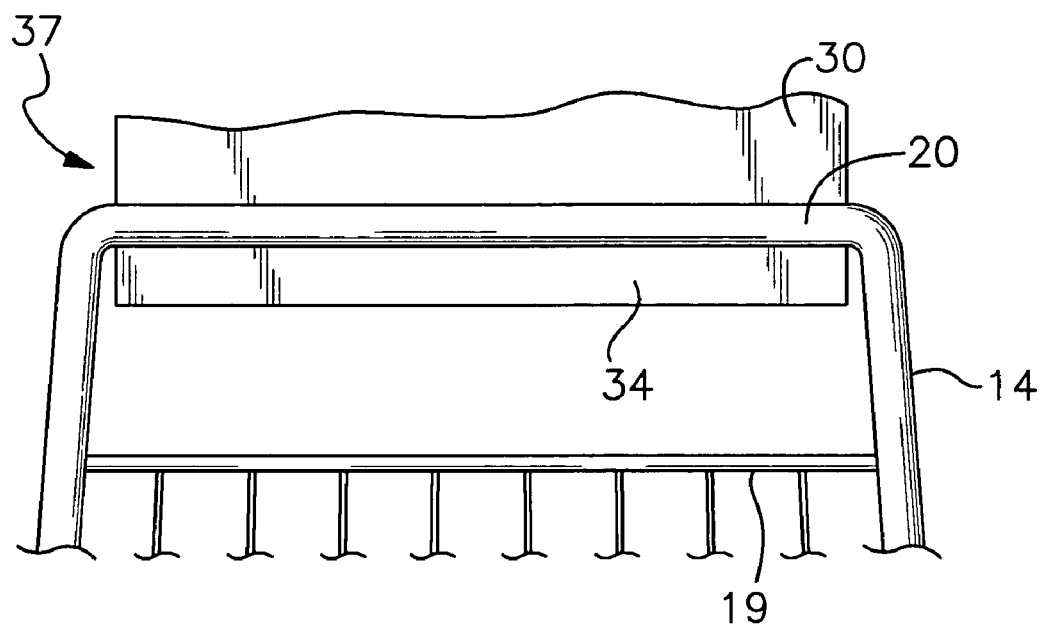
FIG. 6 is a partial bottom view showing the main body mounted onto the frame crossbar or nose by the frame attachment means.
Figure 7:
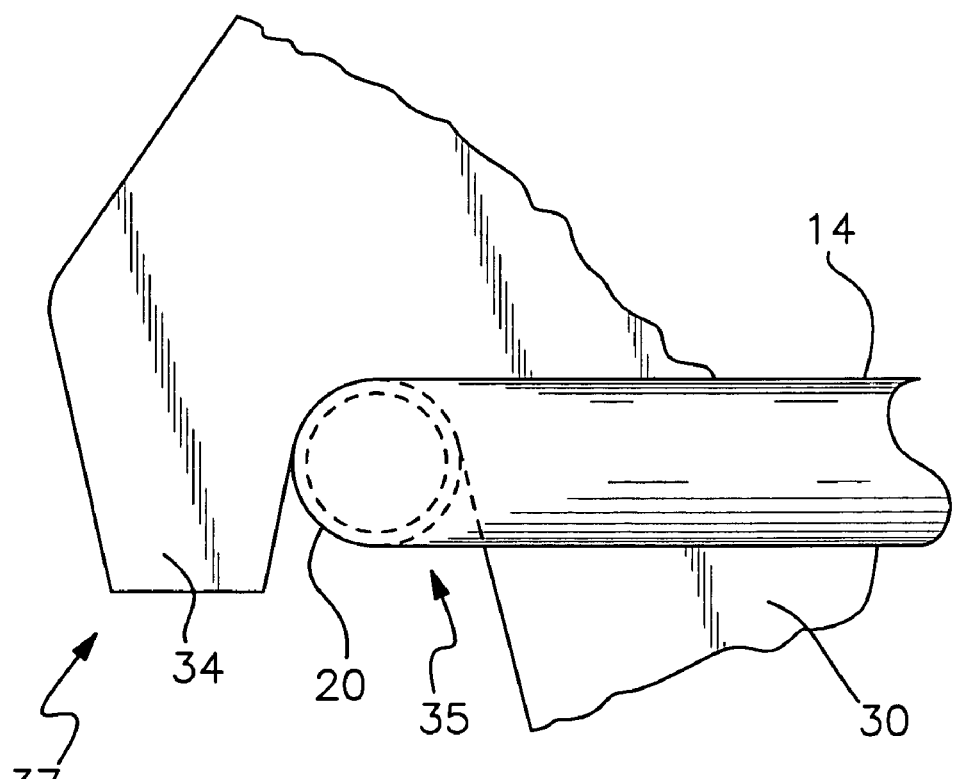
FIG. 7 is a partial side view showing the main body mounted onto the frame crossbar or nose by the frame attachment means.

The main body 30 is mounted to the shopping cart 10 utilizing a combination of frame attachment means 37 and basket attachment means 40, in a manner such that the main body 30 is readily attachable and removable from the shopping cart 10 without recourse or need for altering the original structure of the cart 10. Frame attachment means 37 for joining the main body 30 to the cart lower frame 14 is located at the lower rear of the main body 30 and may comprise separate components connected to the main body 30 but most preferably is formed as an integral, molded element or portion of main body 30. As shown best in FIGS. 6 and 7, a preferred embodiment for frame attachment means 37 comprises a laterally extensive mounting flange or shoulder 34 that contains or defines a laterally extensive frame receiving channel 35. The length and cross-sectional configuration of channel 35 is such that it securely receives the frame crossbar 20, preferably in a press-fit or wedged relationship, with the mounting flange 34 situated to the rear of the frame crossbar 20. The mounting flange 34 and channel 35 most preferably extend the full length of the frame crossbar 20, but each may be truncated so as not to extend over the full length of the frame crossbar 20, or they may be divided to create plural mounting flanges 34 and channels 35, which may even be laterally shortened to form hook-like members. Likewise, other equivalent means to removably mount the main body 30 to the frame crossbar 20 may be utilized for the frame attachment means 37, such as mechanical fasteners or the like. In still another embodiment for frame attachment means 37, the main body 30 may be attached to the side members of the lower frame 14 in addition to or instead of the frame crossbar 20.

Figure 8:
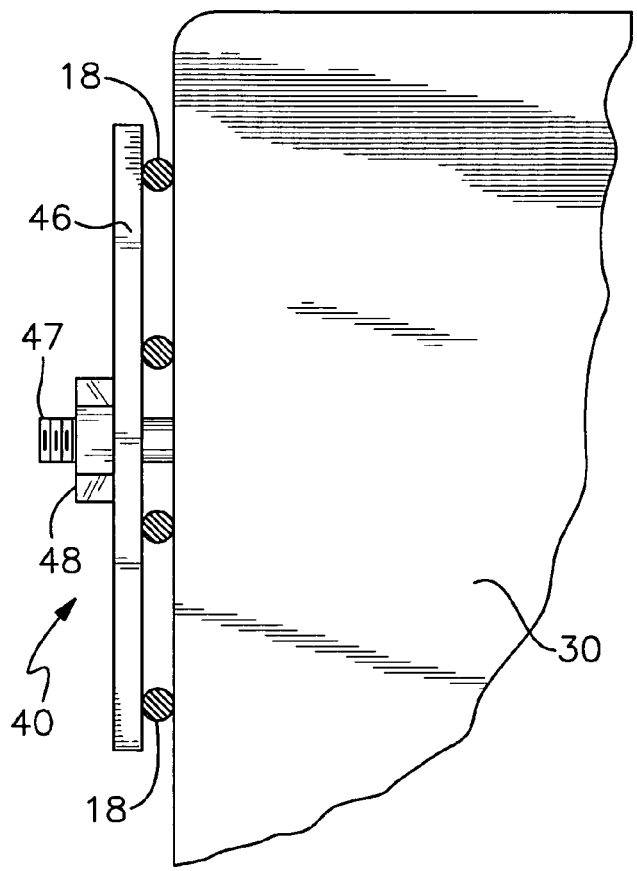
FIG. 8 is a partial side view of the basket attachment means securing the main body to the basket, showing mechanical fasteners.
Figure 9:
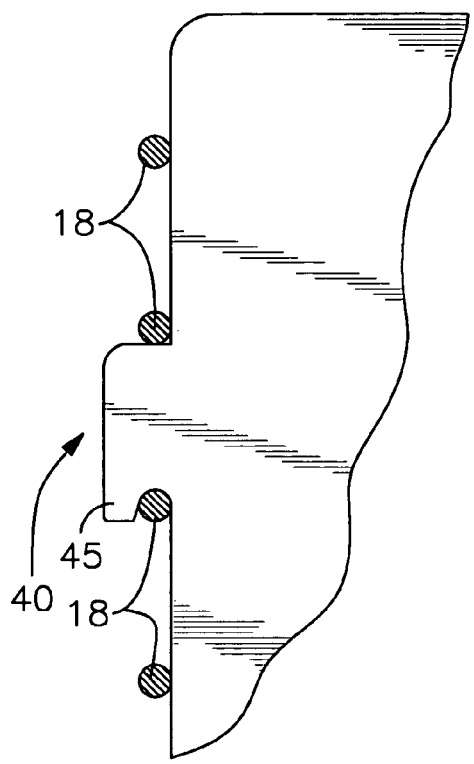
FIG. 9 is a partial side view of an alternative basket attachment means securing the main body to the basket, showing a hook integrally formed in the main body.
Figure 10:
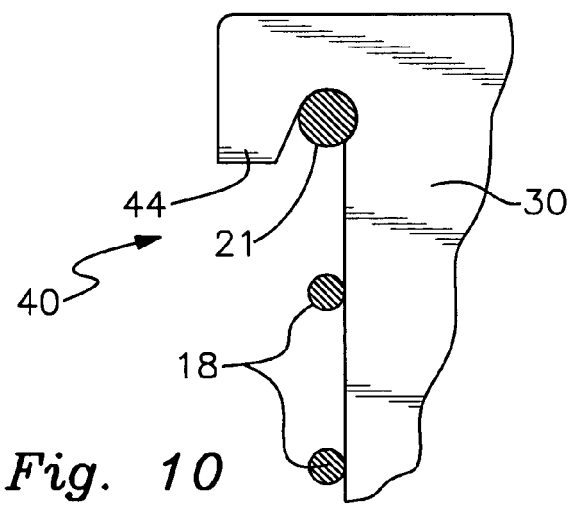
FIG. 10 is a partial side view of an alternative basket attachment means securing the main body to the basket, showing an upper flange fitted to the top of the basket.

The main body 30 is further provided with basket attachment means 40 positioned so as to removably connect with the basket 11, preferably on the wire grid 17 forming the basket front panel 18 or on the top rim 21 of the basket 11. The basket attachment means 40 in combination with the frame attachment means 37 secures the main body 30 to the cart 10 in a manner such that the main body 30 extends forward from and is generally suspended from the front of the cart 10 above the floor. In one embodiment, the basket attachment means 40 comprises mechanical fasteners, such as shown in FIG. 8, consisting for example of a plate member 46 secured by a nut 48 to a threaded bolt 47 extending from the rear of the main body 30 through the basket front panel 18. FIG. 9 shows an alternative embodiment, where the basket attachment means 40 comprises one or more hook members 45 that are configured to be press-fit or wedged into the openings of the basket front panel 18. The hook members 45 are configured such that removal from the basket front panel 18 is possible but will not occur accidentally. FIG. 10 illustrates still another embodiment where the basket attachment means 40 comprises one or more basket flange members 44 that are configured and sized to securely receive the top rim member 21 of the basket 11 in a press-fit or wedged manner. Likewise, other equivalent means to removably mount the main body 30 to the basket 11 may be utilized for the basket attachment means 40, such as clips, straps or the like extended to various locations on the basket 11.

With the child carrier structured as described in the preferred embodiment, the main body 30 is attached to a standard shopping cart 10 by placing the frame receiving channel 35 onto the frame crossbar 20 of the cart 10, tilting the main body 30 upward and to the rear so that it is not contacting the floor or ground, and connecting the basket attachment means 40 to the basket 11. The shopping cart 10 can now be utilized in its normal manner to transport the child or children through the store. Should removal of the child carrier be necessary, such as to replace a defective or damaged cart 10, the basket attachment means 40 is disconnected to release the main body 30 from the basket 11 and the mounting flange 34 is lifted from the frame crossbar 20, thereby completely freeing the child carrier.

It is understood that equivalents and substitutions for certain elements set forth above may be obvious to those skilled in the art, and therefore the true scope and definition of the invention is to be as set forth in the following claims.

We claim:

1. A shopping cart child carrier attachment device removably attachable to a shopping cart having a basket supported above a wheeled, lower frame member having a laterally extending frame crossbar member defining its forward portion, said shopping cart child carrier attachment device comprising:
   a main body sized to receive and support at least one child;
   frame attachment means for removable attachment of said main body to said frame member of said cart; and
   basket attachment means for removable attachment of said main body to said basket of said cart;
   whereby said main body is suspended from the front of said cart.

2. The device of claim 1, wherein said frame attachment means comprises at least one frame receiving channel disposed on said main body, said frame receiving channel adapted to receive said frame crossbar member of said cart.

3. The device of claim 2, wherein said frame attachment means further comprises at least one mounting flange.

4. The device of claim 1, wherein said basket attachment means comprises a mechanical fastener.

5. The device of claim 2, wherein said basket attachment means comprises a mechanical fastener.

6. The device of claim 3, wherein said basket attachment means comprises a mechanical fastener.

7. The device of claim 1, wherein said basket attachment means comprises a hook member.

8. The device of claim 2, wherein said basket attachment means comprises a hook member.

9. The device of claim 3, wherein said basket attachment means comprises a hook member.

10. The device of claim 1, wherein said basket attachment means comprises a basket flange member.

11. The device of claim 2, wherein said basket attachment means comprises a basket flange member.

12. The device of claim 3, wherein said basket attachment means comprises a basket flange member.

13. The device of claim 1, wherein said main body further comprises a support platform.

14. The device of claim 1, wherein said main body further comprises a seat.

15. The device of claim 1, wherein said main body member further comprises at least one entrance.

16. The device of claim 1, wherein said main body further comprises at least one wheel.

17. The device of claim 1, wherein said main body is configured to resemble a vehicle.

18. The combination of a child carrier attachment and a shopping cart, said shopping cart comprising a basket supported above a wheeled, lower frame member having a laterally extending frame crossbar member defining its forward portion, said child carrier attachment being removably mounted to said cart and comprising:
   a main body sized to receive and support at least one child;
   frame attachment means for attaching said main body to said frame member of said cart; and
   basket attachment means attaching said main body to said basket of said cart;
   whereby said main body is suspended from the front of said cart.

19. The combination of claim 18, wherein said frame attachment means comprises at least one frame receiving channel disposed on said main body, said frame receiving channel adapted to receive said frame crossbar member of said cart.

20. The combination of claim 19, wherein said frame attachment means further comprises at least one mounting flange.

21. The device of claim 18, wherein said basket attachment means comprises a mechanical fastener.

22. The device of claim 19, wherein said basket attachment means comprises a mechanical fastener.

23. The device of claim 20, wherein said basket attachment means comprises a mechanical fastener.

24. The device of claim 18, wherein said basket attachment means comprises a hook member.

25. The device of claim 19, wherein said basket attachment means comprises a hook member.

26. The device of claim 20, wherein said basket attachment means comprises a hook member.

27. The device of claim 18, wherein said basket attachment means comprises a basket flange member.

28. The device of claim 19, wherein said basket attachment means comprises a basket flange member.

29. The device of claim 20, wherein said basket attachment means comprises a basket flange member.

30. The device of claim 18, wherein said main body further comprises a support platform.

31. The device of claim 18, wherein said main body further comprises a seat.

32. The device of claim 18, wherein said main body member further comprises at least one entrance.

33. The device of claim 18, wherein said main body further comprises at least one wheel.

34. The device of claim 18, wherein said main body is configured to resemble a vehicle.

* * * * *